(12) United States Patent
Hanna et al.

(10) Patent No.: US 9,792,497 B2
(45) Date of Patent: Oct. 17, 2017

(54) METHODS AND APPARATUS FOR DIRECTING THE GAZE OF A USER IN AN IRIS RECOGNITION SYSTEM

(71) Applicant: EyeLock LLC, New York, NY (US)

(72) Inventors: Keith J. Hanna, Bronxville, NY (US); Jon Demitrieus, New York, NY (US); Hardy Helburn, New York, NY (US); Sarvesh Makthal, Bronx, NY (US)

(73) Assignee: EyeLock LLC, New York, NY (US)

( * ) Notice: Subject to any disclaimer, the term of this patent is extended or adjusted under 35 U.S.C. 154(b) by 139 days.

(21) Appl. No.: 14/852,053

(22) Filed: Sep. 11, 2015

(65) Prior Publication Data

US 2016/0078293 A1    Mar. 17, 2016

Related U.S. Application Data

(60) Provisional application No. 62/049,724, filed on Sep. 12, 2014.

(51) Int. Cl.
    *G06K 9/00* (2006.01)

(52) U.S. Cl.
    CPC ..... *G06K 9/00604* (2013.01); *G06K 9/00617* (2013.01)

(58) Field of Classification Search
    CPC .................. G06K 9/00597–9/00617
    See application file for complete search history.

(56) References Cited

U.S. PATENT DOCUMENTS

| | | |
|---|---|---|
| 4,641,349 A | 2/1987 | Flom et al. |
| 5,259,040 A | 11/1993 | Hanna |
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |

(Continued)

FOREIGN PATENT DOCUMENTS

| | | |
|---|---|---|
| WO | WO-2010/062371 | 6/2010 |
| WO | WO-2011/093538 | 8/2011 |
| WO | WO-2013/122414 | 8/2013 |

OTHER PUBLICATIONS

B. Galvin, et al., Recovering Motion Fields: An Evaluation of Eight Optical Flow Algorithms, Proc. of the British Machine Vision Conf. (1998).

(Continued)

*Primary Examiner* — Aaron W Carter
(74) *Attorney, Agent, or Firm* — Foley & Lardner LLP; Paul M. H. Pua

(57) ABSTRACT

The present disclosure describes systems and methods for directing a gaze of a user to one of different locations or positions of an iris biometric acquisition system for accommodating different heights of individuals. A user attention device may be positioned behind a visibility limiting device, for use in guiding the gaze of the user and positioning an eye of the user with respect to the iris biometric acquisition system. The visibility limiting device may be configured to limit an angular field of view of the user attention device. A sensor may be positioned at, behind or adjacent to the visibility limiting device. The sensor may be configured to acquire imagery of an iris from the eye positioned using the user attention device and the visibility limiting device.

20 Claims, 11 Drawing Sheets

(56) References Cited

U.S. PATENT DOCUMENTS

| | | |
|---|---|---|
| 5,613,012 A | 3/1997 | Hoffman et al. |
| 5,615,277 A | 3/1997 | Hoffman |
| 5,737,439 A | 4/1998 | Lapsley et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,064,752 A | 5/2000 | Rozmus et al. |
| 6,069,967 A | 5/2000 | Rozmus et al. |
| 6,144,754 A | 11/2000 | Okano et al. |
| 6,192,142 B1 | 2/2001 | Pare et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 | 3/2004 | Hanna et al. |
| 6,760,467 B1 | 7/2004 | Min et al. |
| 6,850,631 B1 | 2/2005 | Oda et al. |
| 6,917,695 B2 | 7/2005 | Teng et al. |
| 6,980,670 B1 | 12/2005 | Hoffman et al. |
| 6,985,608 B2 | 1/2006 | Hoffman et al. |
| 7,095,901 B2 | 8/2006 | Lee et al. |
| 7,146,027 B2 | 12/2006 | Kim et al. |
| 7,248,719 B2 | 7/2007 | Hoffman et al. |
| 7,271,939 B2 | 9/2007 | Kono |
| 7,385,626 B2 | 6/2008 | Aggarwal et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,797,606 B2 | 9/2010 | Chabanne |
| 7,869,627 B2 | 1/2011 | Northcott et al. |
| 7,929,732 B2 | 4/2011 | Bringer et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,092,021 B1 | 1/2012 | Northcott et al. |
| 8,132,912 B1 | 3/2012 | Northcott et al. |
| 8,170,295 B2 | 5/2012 | Fujii et al. |
| 8,233,680 B2 | 7/2012 | Bringer et al. |
| 8,243,133 B1 | 8/2012 | Northcott et al. |
| 8,279,042 B2 | 10/2012 | Beenau et al. |
| 8,317,325 B2 | 11/2012 | Raguin et al. |
| 2002/0130961 A1 | 9/2002 | Lee et al. |
| 2004/0160518 A1 | 8/2004 | Park |
| 2005/0084137 A1 | 4/2005 | Kim et al. |
| 2006/0074986 A1 | 4/2006 | Mallalieu et al. |
| 2006/0274919 A1* | 12/2006 | LoIacono ............. G06K 9/6253 382/117 |
| 2007/0211922 A1 | 9/2007 | Crowley et al. |
| 2008/0044063 A1* | 2/2008 | Friedman ............. A61B 3/1216 382/117 |
| 2008/0253622 A1* | 10/2008 | Tosa ................... G06K 9/00604 382/117 |
| 2009/0074256 A1 | 3/2009 | Haddad |
| 2009/0097715 A1 | 4/2009 | Cottard et al. |
| 2009/0161925 A1 | 6/2009 | Cottard et al. |
| 2009/0231096 A1 | 9/2009 | Bringer et al. |
| 2010/0021016 A1 | 1/2010 | Cottard et al. |
| 2010/0074477 A1 | 3/2010 | Fujii et al. |
| 2010/0127826 A1 | 5/2010 | Saliba et al. |
| 2010/0246903 A1 | 9/2010 | Cottard |
| 2010/0278394 A1 | 11/2010 | Raguin et al. |
| 2010/0310070 A1 | 12/2010 | Bringer et al. |
| 2011/0158486 A1 | 6/2011 | Bringer et al. |
| 2011/0194738 A1 | 8/2011 | Choi et al. |
| 2011/0277518 A1 | 11/2011 | Lais et al. |
| 2012/0212597 A1* | 8/2012 | Hanna ................ G06K 9/00604 348/78 |
| 2012/0240223 A1 | 9/2012 | Tu |
| 2012/0242820 A1* | 9/2012 | Hanna ................ G06K 9/00221 348/78 |
| 2012/0257797 A1 | 10/2012 | Leyvand et al. |
| 2012/0268241 A1* | 10/2012 | Hanna ..................... G06F 21/32 340/5.52 |
| 2012/0293642 A1* | 11/2012 | Berini .................... G06F 21/32 348/77 |
| 2012/0293643 A1* | 11/2012 | Hanna ................ G06K 9/00604 348/78 |
| 2013/0051631 A1* | 2/2013 | Hanna ................ G06K 9/00604 382/117 |
| 2013/0162798 A1 | 6/2013 | Hanna et al. |
| 2013/0162799 A1* | 6/2013 | Hanna .................... A61B 5/117 348/78 |
| 2013/0215275 A1* | 8/2013 | Berini .................... G06F 21/32 348/150 |
| 2013/0295994 A1* | 11/2013 | Guitteaud .............. F16M 13/00 455/556.1 |
| 2014/0226876 A1* | 8/2014 | Savvides ............. G06K 9/00604 382/117 |
| 2015/0235431 A1* | 8/2015 | Schowengerdt ...... G06T 19/006 345/633 |
| 2015/0235437 A1* | 8/2015 | Schowengerdt ...... G06T 19/006 345/633 |
| 2016/0078293 A1* | 3/2016 | Hanna ................ G06K 9/00617 382/117 |
| 2016/0210509 A1* | 7/2016 | Hanna ................ G06K 9/00604 |
| 2016/0284091 A1* | 9/2016 | Sarangdhar ............ G01B 11/14 |

OTHER PUBLICATIONS

International Search Report & Written Opinion on PCT/US2015/049742 dated Dec. 23, 2015.

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition, 1994.

R. P. Wildes, Iris Recognition: An Emerging Biometric Technology, Proc. IEEE 85(9) at pp. 134-863 (Sep. 1997).

* cited by examiner

METHODS AND APPARATUS FOR DIRECTING THE GAZE OF A USER IN AN IRIS RECOGNITION SYSTEM

RELATED APPLICATIONS

This application claims priority to and the benefit of U.S. Provisional Patent Application No. 62/049,724, filed Sep. 12, 2014. The entire contents of the foregoing are hereby incorporated herein by reference for all purposes.

BACKGROUND

Biometric data such as iris information is used for user identification and authentication. Biometric systems are designed to acquire images of a user to obtain iris imagery. Such biometric systems typically include an image sensor to take a photo of the user's iris, eye, and/or face, and then perform image analysis to extract iris imagery from the photo.

SUMMARY

Some embodiments of the present invention relate generally to apparatuses, systems and methods for obtaining iris imagery by directing the gaze of a user to different locations of an iris biometric acquisition or recognition system. Examples of these embodiments accommodate individuals of different heights and reduce or eliminate confusion on the part of a user approaching and/or using the system.

In one embodiment, an apparatus for directing a gaze of a user to different predetermined or preconfigured locations of an iris acquisition system is disclosed. Such an integrated user interaction apparatus may comprise: a user attention component or device for a user to adjust the user's position for iris imagery acquisition; a visibility limiting module or device positioned in front of the user attention component such that the user attention device is visible or exposed to the user at a first viewing angle and invisible (e.g., blocked, obscured or not visible) to the user at a second viewing angle due to the structure or functional configuration of the visibility limiting device; and/or a sensor or camera module configured to acquire iris imagery and positioned within a distance of the visibility limiting device and the user attention device.

In one aspect, the present disclosure describes a system for directing a gaze of a user to one of different locations or positions of an iris biometric acquisition system for accommodating different heights of individuals. The system may include a visibility limiting device. A user attention device may be positioned behind the visibility limiting device, the visibility limiting device configured to limit an angular field of view of the user attention device. A sensor may be positioned at, behind or adjacent to the visibility limiting device. The sensor may be configured to acquire imagery of an iris positioned using the user attention device and the visibility limiting device.

In some embodiments, the user attention device includes at least one of a mirror or a graphical user interface display. The visibility limiting device may include at least one of a louver or a privacy film. The system may include a first subsystem that comprises the visibility limiting device, the user attention device and the sensor, and a second subsystem that comprises a second visibility limiting device, a second user attention device and a second sensor. The first subsystem and the second subsystem may be vertically displaced with respect to each other to accommodate different heights of individuals. The first subsystem and the second subsystem may be vertically displaced with respect to each other by between 4 inches to 12 inches, for example. In certain embodiments, the angular field of view of the user attention device of the first subsystem and an angular field of view of the second user attention device of the second subsystem overlap by a minimal to zero amount at an operating distance of the iris biometric acquisition system.

In some embodiments, the system includes an adjustment mechanism for collectively moving the visibility limiting device, the user attention device and the sensor to different height locations or positions. The system may include a pivot mechanism for collectively tilting or rotating the visibility limiting device, the user attention device and the sensor to different relative positions about a horizontal axis. The angular field of view of the user attention device, limited by the visibility limiting device, may in certain embodiments project upwards at an angle above horizontal. The visibility limiting device may include a plurality of louvers oriented in a non-parallel fashion to point towards a preferred location for positioning a user's eye. In some embodiments, an angular field of view of the sensor overlaps with the angular field of view of the user attention device, limited by the visibility limiting device.

In another aspect, the present disclosure describes an iris biometric acquisition system. The system may include a mirror to reflect an image of an eye of a user towards the user. The system may include a visibility limiting device comprising at least one of a privacy film or a plurality of louvers, disposed between the user and the mirror to limit an angular field of view of the mirror. The system may include an image sensor to acquire an image of the iris of the user when the iris is within the angular field of view of the mirror.

In some embodiments, the iris biometric acquisition system includes a first subsystem that comprises the mirror, the visibility limiting device and the sensor, and a second subsystem that comprises a second mirror, a second visibility limiting device and a second sensor. The first subsystem and the second subsystem may be vertically displaced with respect to each other to accommodate different heights of individuals.

In yet another aspect, the present disclosure describes a method for directing a gaze of a user to one of different locations or positions of an iris biometric acquisition system for accommodating different heights of individuals. The method may include limiting, by a visibility limiting device positioned between a user attention device and a user, an angular field of view of the user attention device. The visibility limiting device and the user attention device may provide guidance to the user to position an iris of the user. A sensor, positioned adjacent to the visibility limiting device, may acquire imagery of the iris positioned in accordance with the guidance.

In certain embodiments, the user attention device includes at least one of a mirror or a graphical user interface display. The visibility limiting device may include at least one of a louver or a privacy film. In some embodiments, an adjustment mechanism may move the visibility limiting device, the user attention device and the sensor collectively, to a first height position relative to the user. In certain embodiments, a pivot mechanism may tilt or rotate the visibility limiting device, the user attention device and the sensor collectively, about a horizontal axis, to a first position and/or orientation relative to the user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods for directing a gaze of a user for acquisition of iris data.

A. Network and Computing Environment

Figure 1A:
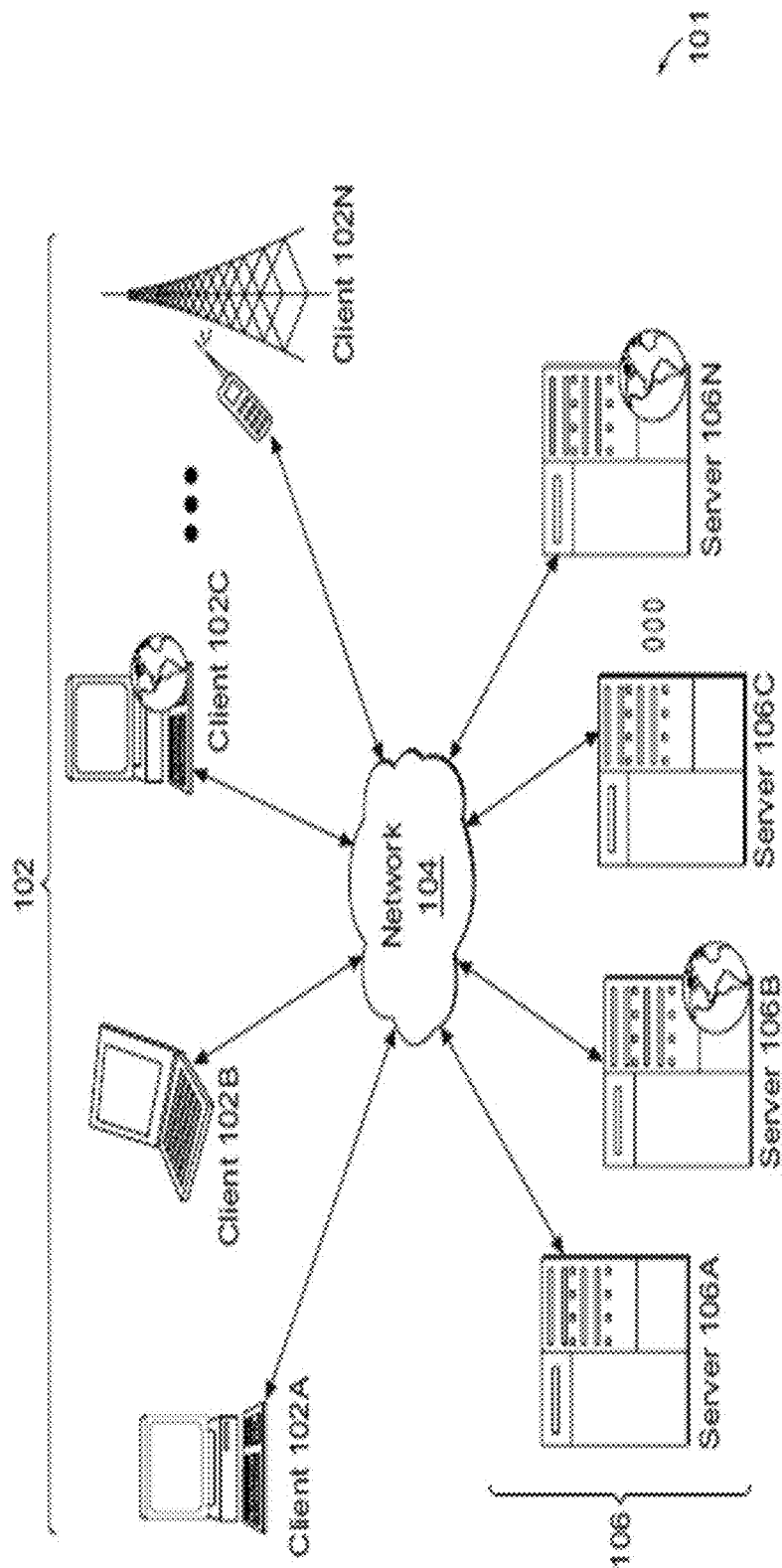
FIG. 1A is a block diagram illustrative of an embodiment of a networked environment with a client machine that communicates with a server.

Before addressing specific embodiments of the present solution, a description of system components and features suitable for use in the present systems and methods may be helpful. FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers. The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; 3G; 4G; or any other protocol able to transmit data among mobile devices.

Figure 1B:
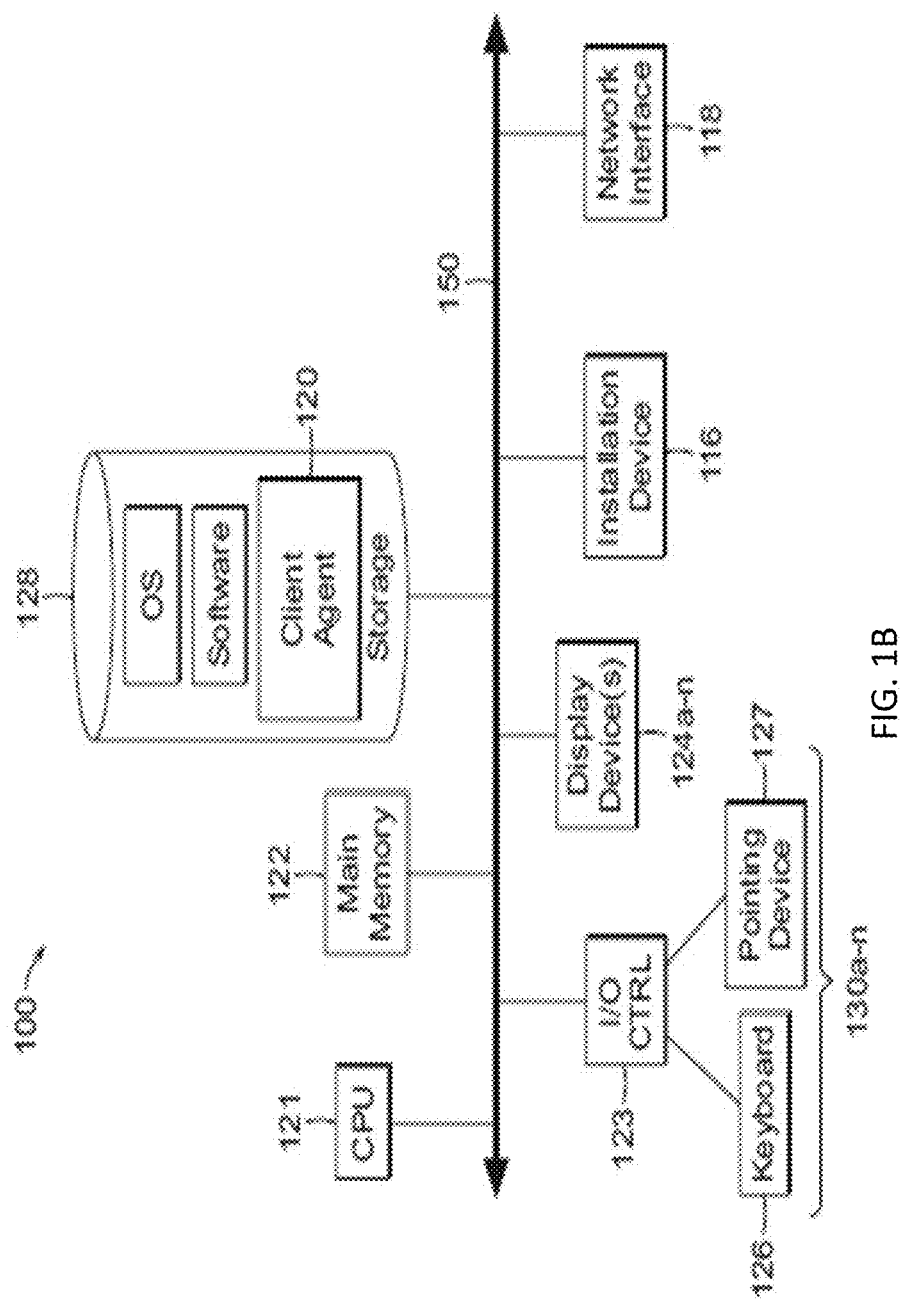
FIGS. 1B and 1C are block diagrams illustrative of embodiments of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
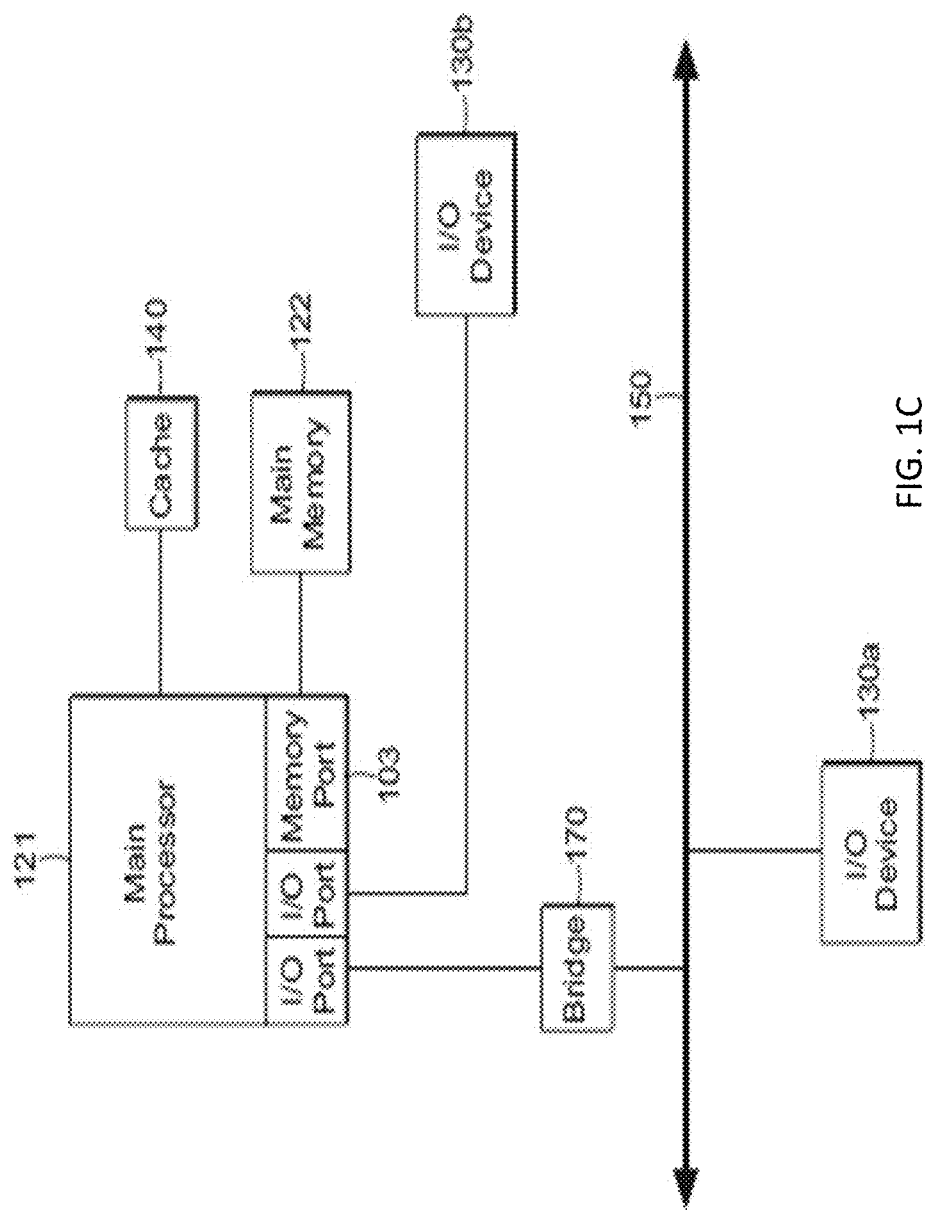

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Directing a Gaze of a User for Acquiring Biometric Images

Figure 2A:
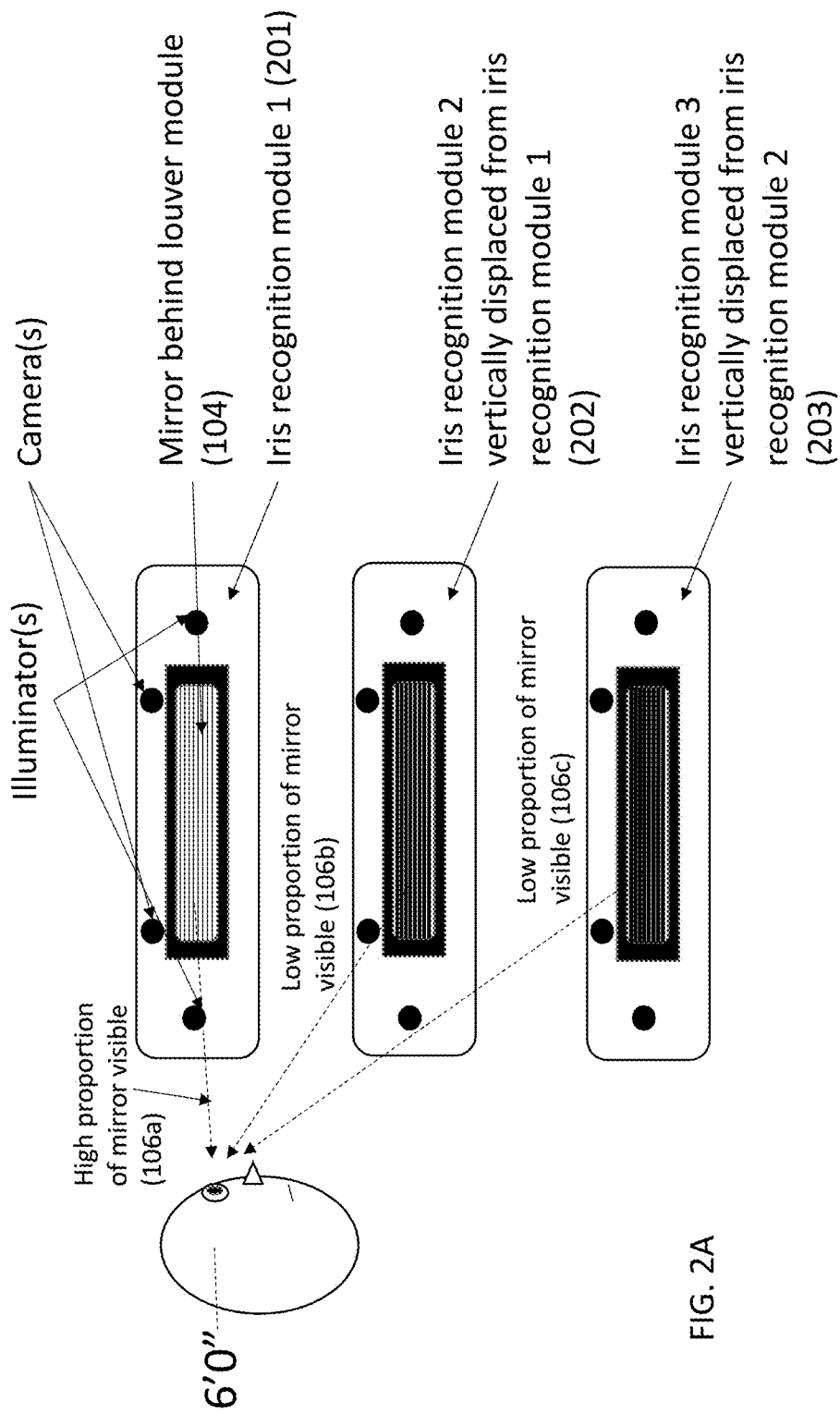
FIG. 2A illustrates a side view of a user positioned in front of a top unit of a plurality of vertically displaced iris biometric acquisition units in one embodiment of an iris biometric acquisition system.
Figure 2B:
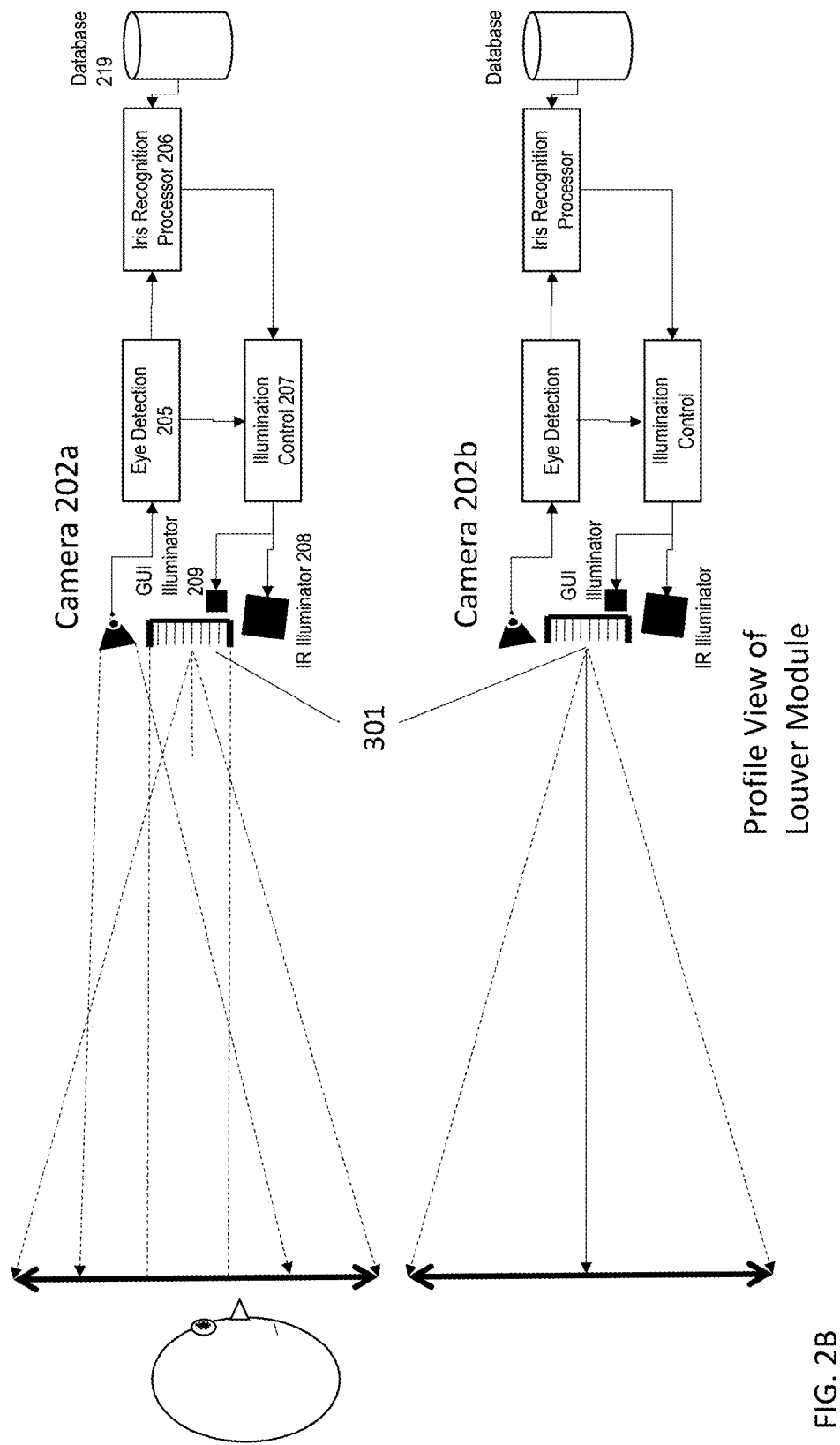
FIG. 2B shows components in one illustrative embodiment of an iris biometric acquisition system comprising a plurality of vertically displaced iris biometric acquisition units each with cameras, illuminators, and a graphical user interface.

Referring to FIGS. 2A and 2B, example embodiments of a system for directing a gaze of a user for acquisition of iris data is depicted. As shown, an iris biometric acquisition system may acquire imagery of an iris using one or more cameras or image sensors, such as charge-coupled device (CCD) or complementary metal-oxide semiconductor (CMOS) arrays, for instance. The one or more cameras or image sensors may comprise a sensor operating in the infra-red region for biometric acquisition, and/or in the visible light region in some embodiments. An iris biometric acquisition system is sometimes referred to as an iris recognition system. In some embodiments, the gaze of a user is directed to one of a plurality of predetermined or preconfigured locations of an iris biometric acquisition system, the plurality of predetermined or preconfigured locations provided in order to accommodate different heights of individuals. The system directs the gaze of the user while avoiding confusion of the user arising from the multiple locations to which the user can direct the gaze. For example, conventionally and without use of the integrated user interaction device described below, a mirror (or other device) may be positioned on an iris recognition system to aid in positioning the user. The user can then be asked to (1) find the mirror and (2) move so their eyes are reflected in the mirror. If the user can observe their eyes in the mirror, and if the mirror height is within the camera field of view cone at the operating distance of the iris recognition device, then an image of the iris of the user may be acquired using at least one of the cameras (image sensors).

However, positioning the eyes relative to the system is often confusing for a user since even when the eyes are not present in the camera field of view, the mirror would still appear bright and reflective to attract the gaze of the user, so that the user focuses on content of a scene reflected off the mirror, which may be small, to determine whether their eyes are present in the reflected view and therefore within the camera field of view. The problem is made even worse if multiple iris biometric acquisition camera units are positioned above each other, e.g., in order to accommodate individuals of different heights. In this case, the individual may observe three bright and reflective surfaces for guiding positioning of the user relative to each of the camera units, but do not know which one to focus on. This is exacerbated even further when the iris biometric acquisition units are tilted from the horizontal, so that each camera field of view is not parallel to the user's direction of approach, so that a mirror that appears to be the correct height may in fact be pointing up for instance, and too high for the user to center upon, resulting in the user having to reposition the user's eyes to a mirror on a lower device. These hurdles to device usage increase the number of steps a user has to perform when using the iris recognition system. They also increase the potential for confusion and therefore unnecessarily require a longer time for device-usage. This reduces throughput of the iris recognition device, which may be used at a high-throughput location such as a turnstile location, for example.

The iris-recognition apparatuses, systems, and methods disclosed herein addresses these problems in several aspects. A first feature may comprise an integrated user interface module that comprises a camera sensor, a visibility-limiting device (e.g., device 104 in FIG. 2A) positioned in front of a mirror (e.g., mirror 102). The integrated user interface module may for example limit the visibility of the mirror at least from a top and a bottom viewing angle (e.g., to a user of medium height), and allows visibility of the mirror in a middle viewing angle (e.g., a larger proportion of mirror is visible or exposed at 106*a*, and a lower proportion of mirror is visible at 106*b* or 106*c*). The middle viewing angle in some embodiments may be smaller than the field of view of the iris biometric acquisition camera(s) for that unit of the iris recognition system at a certain operating distance. The visibility limiting device may also limit the visibility of other user attention facility for the user to adjust his or her position, such as using a graphical user interface (GUI) display, indicator or illuminator 209 as shown in FIG. 2B, in the same way that visibility of the reflection off the mirror is limited. This also reduces confusion to the user since the feedback from the display or indicator becomes (e.g., may only be) visible when the user is within the operating cone of the device.

Figure 3:
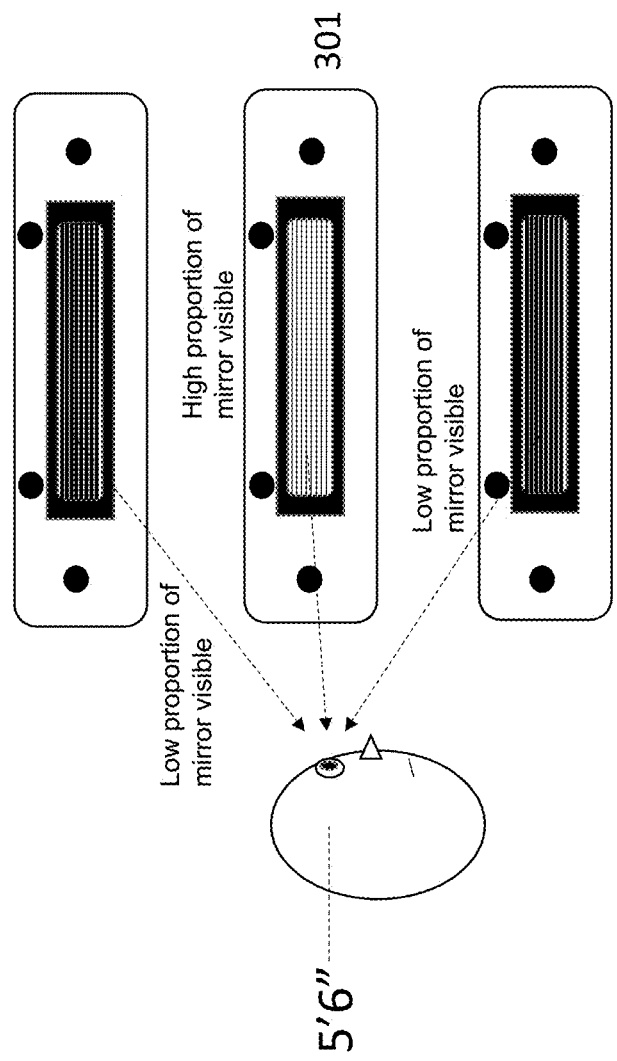
FIG. 3 illustrates a side view of a user positioned in front of the middle unit of three vertically displaced iris biometric acquisition units in one embodiment of an iris biometric acquisition system.
Figure 4:
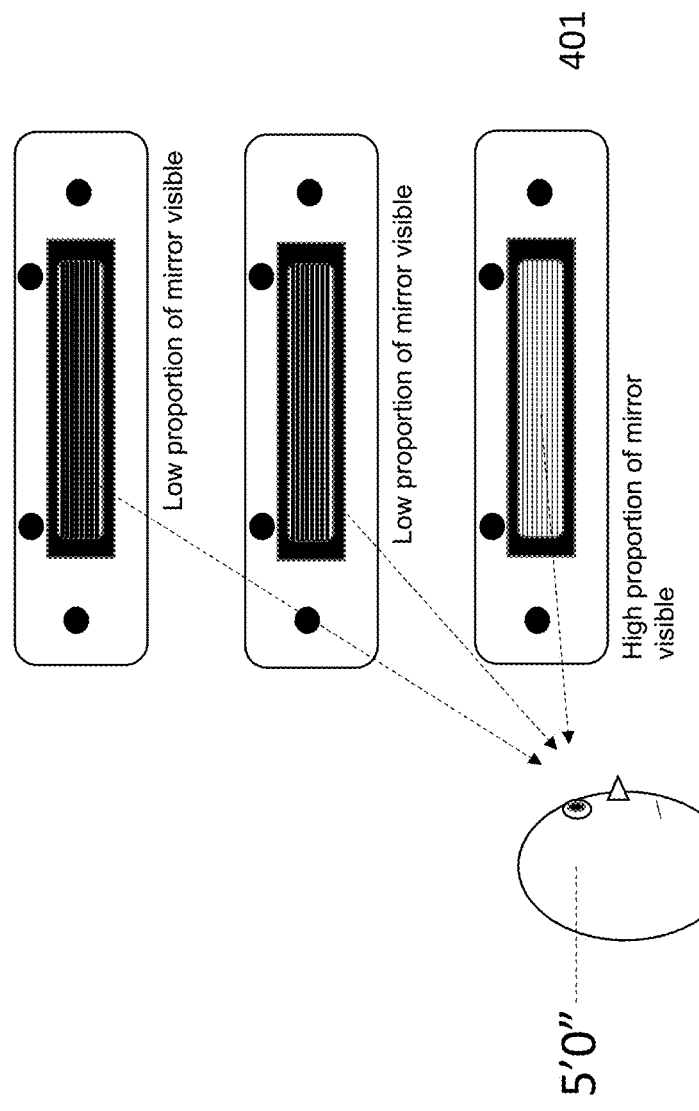
FIG. 4 illustrates a side view of a user positioned in front of a lower unit of three vertically displaced iris biometric acquisition devices in one embodiment of an iris biometric acquisition system.

The integrated user-interaction device may be configured in several embodiments. In a first embodiment, one user interaction device may be positioned on a pivot and/or on a mirror that can rotate in unison with the sensor or camera module. A user or other mechanism can then pivot the module, and the user observes a bright reflective surface when the integrated user-interaction device is positioned in the middle viewing angle cone (e.g., for a medium height user), and not above the top viewing angle or below the viewing angle. In another embodiment, the user interaction device is positioned on a vertically-oriented mechanism that moves up and down either automatically or manually. A user or other mechanism can then adjust the height of the user interaction device, and the user observes a bright reflective surface or alignment indicator when the integrated user-interaction device is moved to a height aligned with the user's eye. In a further embodiment, the user interaction device may be duplicated vertically to provide multiple instances for instance, to accommodate the varying heights of individuals, as shown in the three units positioned relative to each other in FIG. 2A (e.g., see 201, 202 and 203). In FIG. 2A, the user has a height of approximately 6' by way of illustration, while in FIGS. 3 and 4 the users have heights of approximately 5'6" (medium height) and 5'0" (lower height), respectively, for example. In FIG. 2A, due to the visibility limiting device, the mirrors in the bottom two devices (e.g., 202, 203) are largely blocked or not visible to the user, yet the mirror at the top module (e.g., 101) is visible even if the user's eyes are not yet reflected in the mirror as the user approaches the system. The user is therefore not confused about which device to center or position the user's eyes against. And as the user approaches the system, the user may focus on the upper/top device for example, which is at least approximately aligned with the height of the user's eye. In FIG. 3, on the other hand, the user with a height of approximately 5'6" may primarily see the mirror system on the middle unit (e.g., 301), rather than the other mirrors at different heights. Similarly, FIG. 4 illustrates that a user with a height of approximately 5'0" may primarily see and align with the mirror of the bottom unit (e.g., 401).

Figure 7:
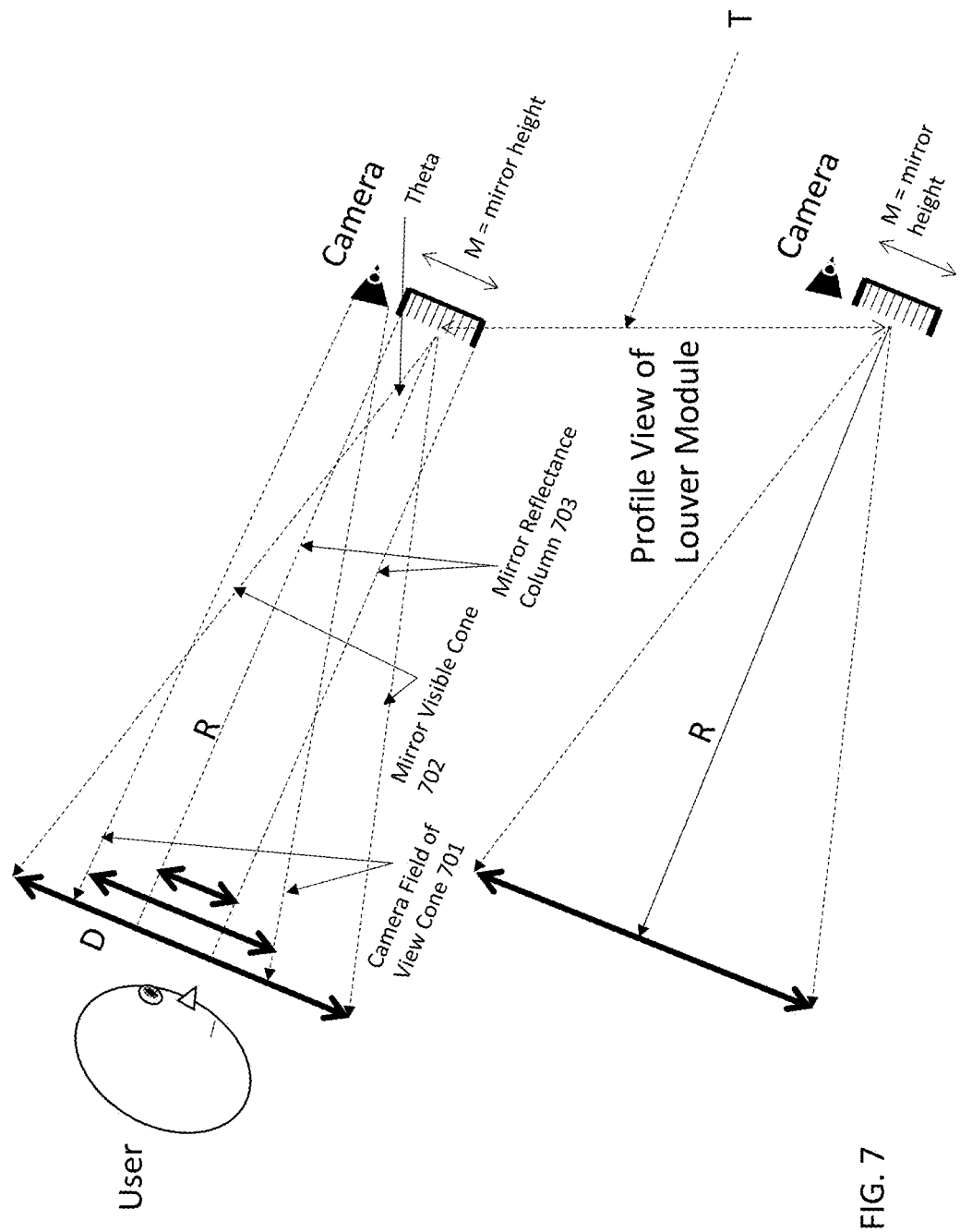
FIG. 7 shows a side view of a camera field of view cone, a mirror visibility cone and a mirror reflectance cylinder for one illustrative embodiment of a configuration of a plurality of integrated user interaction devices displaced vertically from each other and oriented to tilt upwards such that the user interaction devices are pointed in a non-horizontal direction.

One embodiment of a multi-unit configuration is illustrated in FIG. 7, where each unit is tilted upwards at an angle. This means that the eyes of a user may not intersect with any of the mirror visibility cones at a far distance from the device, which means that the user may not be confused by observing multiple bright reflective mirrors at a distance, such confusion leaving the user unsure of which one is the target mirror in which the user should locate the user's eye. As the user gets closer to the units, depending on the height of the eye, the eye can at least partially intersect with or enter one of the mirror visibility cones. At that point, the user partially sees one bright reflective mirror (and not the others), and therefore should have no confusion that the user is to position himself/herself further using that mirror alone. As the user further approaches the system, the user can position the user's eyes so that the user sees the eyes' reflections in that particular mirror, without any confusing visibility of other bright reflective surfaces of adjacent mirrors due to the mirrors' visibility limiting modules.

FIG. 2B shows an embodiment of a system for directing the gaze of a user for acquisition of iris data. The illustrated system may be part of an iris biometric acquisition system. The system may include multiple sub-systems, each including one or more of a camera 202, a GUI illuminator 209, and IR illuminator 208, an eye detection unit 205, an illumination control unit 207, an iris recognition processor 206, or a database 219, for instance. Each subsystem may share some of these elements, and/or have redundant/duplicate instances of certain elements. Each of the above-mentioned elements or entities is implemented in hardware, or a combination of hardware and software, in one or more embodiments. For instance, each of these elements or entities could include any application, program, library, script, task, service, process or any type and form of executable instructions executing on hardware of the system, in one or more embodiments. The hardware includes circuitry such as one or more processors, for example, as described above in connection with at least 1B and 1C, in one or more embodiments.

In some embodiments, the user may position himself/ herself in one of the camera fields of view using the user interaction modules working in conjunction with each other, and may be configured so that there may be little to no overlap between the mirror visibility cones between adjacent iris recognition modules at the operating distance of the device. This may prevent confusion for the user in determining which device is appropriate to use for the user's height. The mirror visibility systems 301 may be configured so that they are vertically displaced from each other at a distance of approximately 6" for instance, to accommodate different ranges of heights that account for different heights of individuals.

Images may be acquired by the camera 202a-b and the acquired images may then be processed to perform eye detection and iris recognition. An example eye finding or detection process may include detecting the circular pupil/ iris boundary and the iris/sclera boundary using an eye detection processor 205 that performs a Hough transform on the acquired image, e.g., as described in U.S. Pat. No. 3,069,654, which is hereby incorporated herein by reference in its entirety. The eye detection processor 205 passes a representation of the detected eye to an iris recognition processor 206, which recovers the iris data from the detected eye, encodes the recovered iris data, and compares the encoded data to previously encoded iris data or templates stored in a database 219. One or more examples of an iris recognition processor 206 and the process(es) executed by the iris recognition processor 206 are described in U.S. Pat. No. 5,291,560 to Daugman, which is hereby incorporated herein by reference in its entirety. The results of the eye detection and iris recognition modules may be transmitted to an illumination control module 207, that may control one or more illuminators 208 and/or a graphical user interface (GUI) display 209, such as a liquid crystal display (LCD) with a touchscreen interface, that may be positioned in front of, behind, or beside the visibility-limiting module.

In some embodiments, other visibility limiting modules may be used in place of the louvers described in this specification. For example, thin-film privacy filters or panels, such as those produced by 3M, may be used, including the louvered privacy films disclosed in U.S. Pat. No. 3,524, 789, which is hereby incorporated herein by reference.

Figure 5:
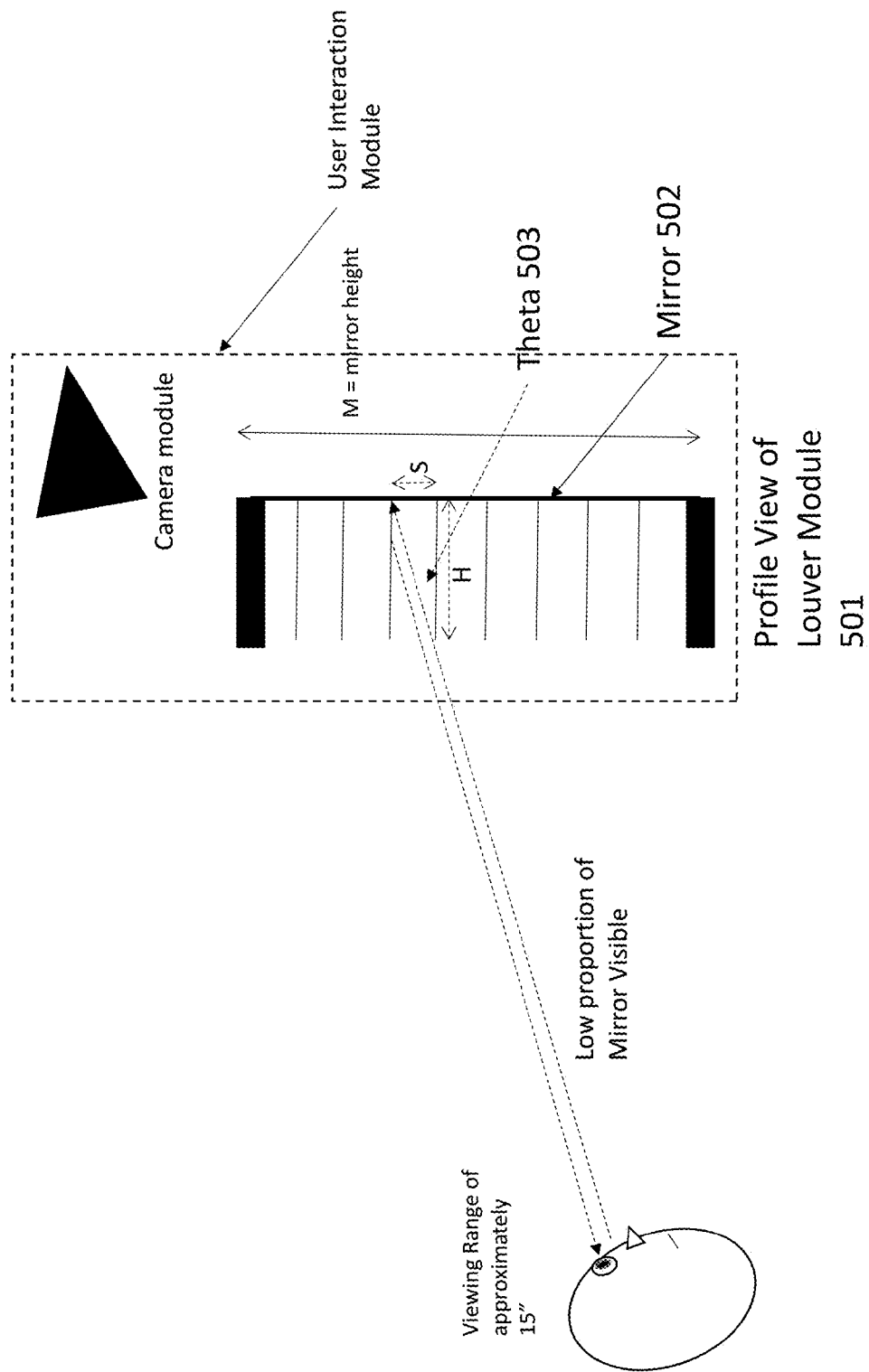
FIG. 5 shows a profile (side) view of one embodiment of an integrated user interaction device comprising a visibility-limiting device, a mirror positioned behind the visibility-limiting device, and a sensor positioned adjacent to both the visibility-limiting module and the mirror, as well as showing a user viewing the integrated user interaction module from a bottom, on-axis viewing angle.

FIG. 5 shows a component of an example iris biometric acquisition system. It shows a profile view of the integrated user interaction device comprising a camera, the visibility limiting device 501, and a mirror positioned behind the visibility limiting device. In this particular embodiment, the visibility limiting device 501 comprises louvers of height H with separation S. From geometry, FIG. 5 shows that at a viewing angle Theta (503) of arcTan(S/H), the mirror 502 may not be visible to the user. In order to enhance the properties of the visibility limiting module, the louvers may be matte-colored and/or dark-colored to avoid reflection of light off the mirror, and/or off the louvers, and into the user's eyes.

Figure 6:
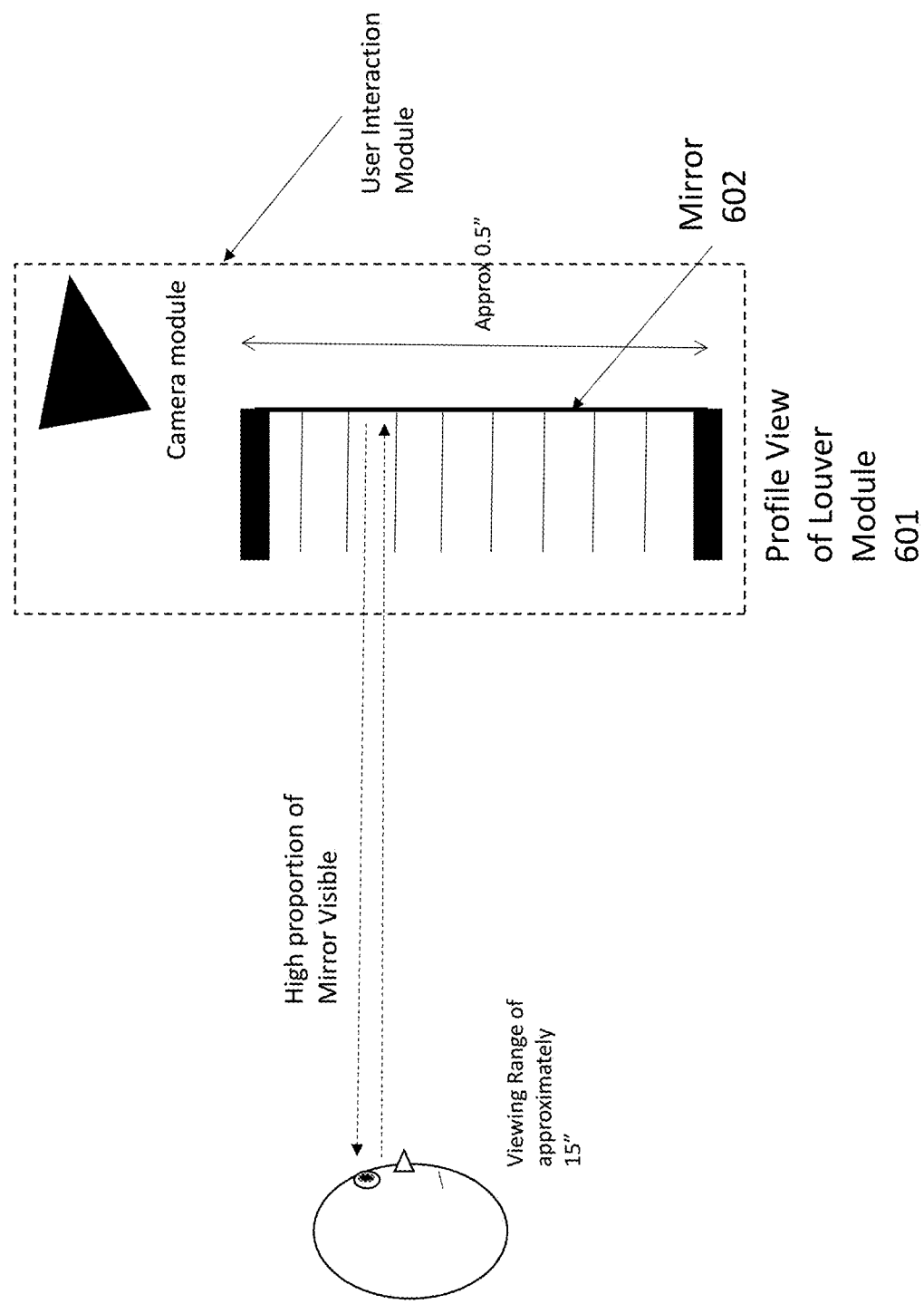
FIG. 6 shows a profile (side) view of one embodiment of an integrated user interaction device comprising a visibility-limiting module, a mirror positioned behind the visibility-limiting device, and a sensor or camera module positioned adjacent to both the visibility-limiting device and the mirror, as well as showing a user viewing the integrated user interaction device from a middle, on-axis viewing angle.

FIG. 6 shows a similar profile view. Here, there is an on-axis viewing angle of zero such that the mirror is almost fully visible. In one embodiment, the louvers are oriented so that they are non-parallel, and are configured to be all oriented to point towards a single point at the preferred operating distance for the user for that module (601) of the system. Since the user is relatively close to the visibility limiting module (601), then the perspective projection view of the sides of the louvers, if the louvers are parallel to each other particularly at the top and bottom portions of the visibility limiting module (601) can reduce the percentage of mirror that is visible to the user. A preferred percentage of mirror (602) that is not visible at the desired on-axis viewing angle has been found to be less than 5%, or the obstruction of the mirror becomes distracting to the user as the user locates the user's eyes from the reflection. For example, if the thickness of the louvers is Th and the separation is S, then the proportion of the mirror that is not visible is Th/S (e.g., assuming that S is measured from the centers of adjacent louvers). In one embodiment S may be 0.1", and Th may be 0.001", which results in a percentage of mirror of 1% that is not visible, which is within the acceptable preferred limit described above.

FIG. 7 shows in more detail the camera viewing cone, the mirror viewing cylinder, and the mirror visibility cone. The camera viewing cone (701) is defined by the properties of the camera and lens module used in the user interaction module. In some configurations, it may range from 30 degrees to 5 degrees. The height of the mirror viewing cylinder (e.g., the mirror reflectance column 703) is defined by the height M of the mirror since it defines the region in which a user can see the user's eyes due to direct reflection off the mirror. The mirror visibility cone 702 is defined by the angle Theta, θ (described earlier in this specification) and the range R of the user, such that from geometry, the distance D that a portion of the mirror can be seen is given by D=2R tan θ. In some embodiments, the width M of the mirror visibility cylinder may be less than the width D of the mirror visibility cone. This means that a particular mirror may be observed to be at least partially bright and reflective to the user as they approach, as a means to attract the user to that particular mirror and so that they can then subsequently position themselves more precisely within the mirror visibility cylinder so that they can see the reflection of their eyes.

The mirror, the visibility-limiting device and the sensor together may form an integrated device with interdependent functionality, as shown in FIG. 7. The sensor may be positioned either at the position of the mirror (e.g., with the mirror being reflective in the visible spectrum but transparent in the infra-red spectrum) or such that the distance between the mirror and the sensor subtends an angle to the user's eye that is less than a threshold. If the subtended angle is below the threshold, then as the user is approaching the integrated device with the aim of locating the user's eyes in the mirror, then the perspective distortion of the iris image captured by the camera by the off-angle view of the iris may be sufficiently small such that the performance of subsequent processing, that may expect an on-angle view of the iris, is unaffected. In addition, if the subtended angle is below a threshold, then there is a reduced probability, compared to the case of a subtended angle being above the threshold, of the image of the iris acquired by the sensor being obscured by eyelashes of the eye in front of the iris. Further, if the subtended angle is below the threshold then an eye detector, which in some embodiments in a complete system is an initial step in processing, can be presented with a frontal view of the eye and can operate more optimally in detecting the eye, using for example the detection of the shapes of the pupil/iris and iris/sclera boundaries that are circular when presented in an on-axis view to a sensor. An example eye finding process to detect the circular pupil/iris boundary and the iris/sclera boundary using a Hough transform, is described in U.S. Pat. No. 3,069,654, which is incorporated herein by reference. A preferred subtended angle threshold may be 25 degrees, for instance.

Regarding the visibility-limiting device, one of its functions is to encourage the user to reduce the user's off-axis gaze angle with respect to the perpendicular axis of the mirror since the bright reflective surface is not visible to the user at large off-axis angles and therefore it is an incentive for the user to move until they do see something bright and reflective, even if the reflection of the eyes are not yet visible to the user in the mirror. In conjunction with this function of the visibility-limiting device, if the displacement between the mirror and the sensor is such that it subtends an angle to the user's eye that is less than a threshold as has been described above, then the camera sensor can be able to perform eye detection even before their eyes are positioned on-axis to the mirror since the view of the iris would be primarily frontal to the camera axis and therefore optimal for eye detection, as described above. This functionality is possible if there is overlap of at least part of the camera field of view cone with the mirror visibility cone as shown in FIG. 7. Such eye detection even before the user has positioned the eyes directly on-axis to the mirror may be useful in order to modify the GUI feedback to provide instructions to the user that the user is moving in the correct or wrong direction for example, or to provide sufficient advance time to adjust the brightness of the illumination to ensure the illumination is at an optimal brightness level by the time the user has reached the on-axis view of the mirror in order to avoid delays in system performance and the latency in the user's experience.

Figure 8:
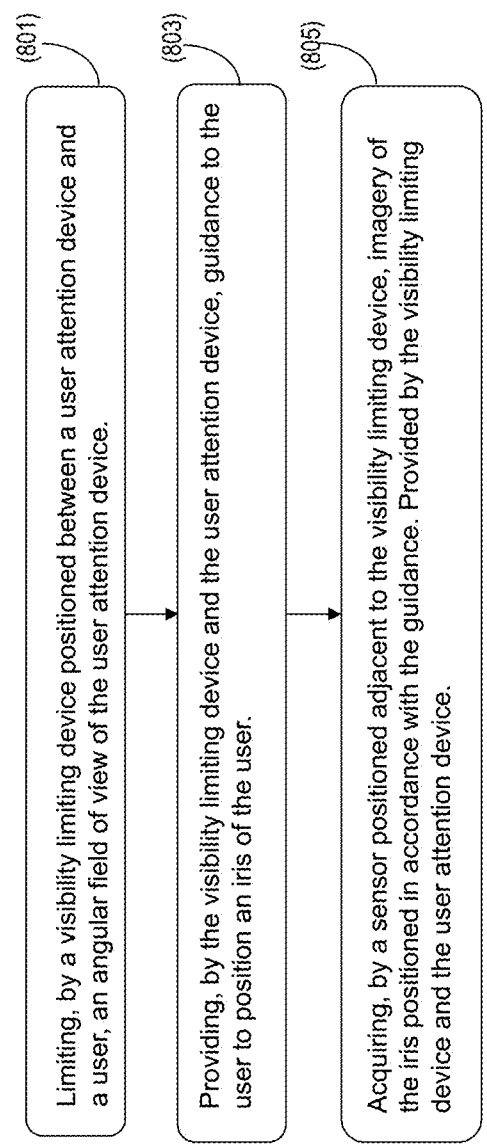
FIG. 8 is a flow diagram illustrative of a method of directing a gaze of a user for acquisition of iris data.

Referring now to FIG. 8, one embodiment of a method for directing a gaze of a user to one of different locations or positions of an iris biometric acquisition system for accommodating different heights of individuals is depicted. The method includes limiting, by a visibility limiting device positioned between a user attention device and a user, an angular field of view of the user attention device (801). The visibility limiting device and the user attention device provide guidance to the user to position an iris of the user (803). A sensor, positioned adjacent to the visibility limiting device, acquires imagery of the iris positioned in accordance with the guidance (805).

In some aspects, an iris biometric acquisition system may include or provide a number of different locations or positions to accommodating individuals with different heights. Rather than requiring a user to extend or lower himself/herself, to position the user's eyes with respect to one or a fixed position and/or orientation of the iris biometric acquisition system, the system may for instance be adjustable to different locations or positions, including orientations. In some embodiments, the system may have a number of predetermined locations or positions for a user to position the user's eye(s). In certain embodiments, because the iris biometric acquisition system provides various locations or positions for an approaching user, it may be confusing for the user to align or position the user's eye(s) with the system. Accordingly, the system provides an integrated user interaction system to help guide or direct the user's gaze in positioning the user's eye(s) for biometric acquisition. By attracting the attention of the user as the user approaches or positions himself/herself towards the system, selectively in certain preferred directions corresponding to the height of the user, the user is efficiently and clearly guided to an optimal or appropriate position for the user relative to the system.

Referring now to 801, and in some embodiments, a visibility limiting device, positioned between a user attention device and a user, limits an angular field of view of the user attention device. The visibility limiting device may structurally and/or optically limit the angular field of view of the user attention device. For instance, the visibility limiting device may block, shield, dim, obstruct or otherwise limit light rays from the user attention device in certain directions, and allow, pass or transmit light rays from the user attention device in certain other directions. The visibility limiting device may pass and/or block different portions of light in different directions angled with respect to the horizontal, for instance. The user attention device may include at least one of a mirror or a graphical user interface display. The mirror include any type of reflecting or partially-reflecting surface, and may reflect light and provide a reflected image of the user to direct the user's gaze towards the mirror, and/or to position the user's eye relative to the mirror. The graphical user interface display may display an image of the user, and/or provide any type of indication or guidance to the user to direct the user's gaze towards the mirror, and/or to position the user's eye(s) and hence iris relative to the graphical user interface display.

The visibility limiting device may include at least one of a louver or a privacy film. The visibility limiting device may include a plurality of louvers in parallel with other, or oriented in a non-parallel fashion to point towards a preferred location for positioning a user's eye. For instance, the plurality of louvers may be configured such that when the user is located at a preferred or optimal position (e.g., near the biometric acquisition device) for biometric acquisition, the plurality of louvers provides the least or minimal obstruction to the user attention device.

In some embodiments, the angular field of view of the user attention device (sometimes referred to as the mirror visibility cone or attention device visibility cone) of the first subsystem and an angular field of view of the second user attention device of the second subsystem overlap by a minimal to zero amount at an operating distance (e.g., a preferred or optimal distance from a specific location) of the iris biometric acquisition system. The operating distance may refer to a preferred or configured location or distance from the iris biometric acquisition system (e.g., the sensor, the visibility limiting device and/or the attention device) at which an iris should be positioned for biometric acquisition.

In some embodiments, the angular field of view of the user attention device, limited by the visibility limiting device, projects upwards at an angle above horizontal. This may provide that a user not see the user attention device when far, with more portions of the user attention device available through the visibility limiting device when near. An angular field of view of the sensor (sometimes referred to as the sensor or camera field of view cone) may overlap with the angular field of view of the user attention device which is limited by the visibility limiting device. In some embodiments, an eye detection device of the iris biometric acquisition system may perform eye/iris detection even before an eye is positioned on-axis to the mirror for example. The sensor nay be positioned proximate to or at the location of the user attention device so that the sensor subtends an angle to the user's eye that is less than a predetermined threshold. For instance, the sensor may be located behind the mirror or GUI device that allows infrared light to transmit through the visibility limiting device.

In some embodiments, the iris biometric acquisition system may include a first subsystem that comprises the visibility limiting device, the user attention device and the sensor, and a second subsystem that comprises a second visibility limiting device, a second user attention device and a second sensor, among others for example. The first subsystem and the second subsystem are for example vertically displaced with respect to each other to accommodate different heights of individuals. The first subsystem and the second subsystem may be vertically displaced with respect to each other by between 4 inches to 12 inches, to accommodate different height ranges for individuals.

Referring now to 803, and in some embodiments, the visibility limiting device and/or the user attention device provide guidance to the user to position an iris of the user. One or more visibility limiting devices and/or one or more user attention devices may provide guidance to the user to position an iris of the user with respect to the system. As a user approaches the iris biometric acquisition system while still being afar, the user may not detect any or much of the one or more user attention devices. As the user moves closer to the system, the visibility limiting device selectively exposes a larger portion of a first user attention device, to guide the user's gaze towards the first user attention device. In some embodiments, the same or other visibility limiting device(s) may selectively reduce the visibility of (e.g., by dimming or blocking) one or more other user attention devices, e.g., located above and/or below the first user attention device, so that the user's gaze is guided towards the first user attention device rather than towards these other user attention device(s).

In certain embodiments, the system may include an adjustment mechanism and/or a pivot mechanism. The adjustment mechanism may move (e.g., by operation of the user or automatically) the user attention device and the sensor collectively, to a first height position relative to the user. The pivot mechanism may tilt, orient or rotate, about a horizontal axis, the visibility limiting device, the user attention device and the sensor collectively, to a first position relative to the user. For instance, the system may provide a single set of visibility limiting device, user attention device and/or the sensor, which can be adjusted to various positions and/or locations, including heights and/or orientations, with respect to the user. One or more of these mechanisms can aid in the relative positioning of the user's eyes with the system, for biometric acquisition.

The visibility limiting device and/or the user attention device may draw or direct the gaze of the user towards the user attention device appropriate for the user's height. The user attention device, comprising a mirror or GUI device for example, may provide a reflection or feedback to the user to position and/or orient the user's eyes relative to the system (e.g., the user attention device and/or the sensor). For instance, a mirror may guide the user to position an eye so that the eye is on-axis with respect to the mirror, e.g., the eye is reflected by the mirror and visible to the user without the visibility limiting device substantially blocking the visibility of the reflection. By way of illustration, the blocking (in an on-axis or appropriate position) may be limited to below a 5% threshold as discussed earlier, or may be set at a threshold of 2%, 8%, 10% for example. The user may adjust the user's position so that the eye and iris is appropriately or optimally visible and/or on-axis (within the visibility cylinder of the user attention device) according to feedback from the user attention device.

Referring now to 805, and in some embodiments, a sensor, positioned adjacent to the visibility limiting device, acquires imagery of the iris positioned in accordance with the guidance. In some embodiments, a detection device may detect an eye and/or iris being positioned with respect to the system. For example, the detection device may be integrated or coupled to the sensor to detect, via acquired image(s), the eye and/or iris within the visibility or detection cone of the sensor and within an operating distance of the system (e.g., with appropriate illumination and/or determination of an appropriate size and/or orientation of the eye or iris). In certain embodiments, the detection device may perform detection even before the eye and/or iris are positioned on-axis to the user attention device (e.g., on-axis to the mirror). For instance, the visibility or detection cone of the sensor may be configured to be sufficiently wide to allow detection even before the eye and/or iris are located within a visibility cone or a visibility cylinder of the user attention device or mirror. Responsive to the detection, the system may adjust illumination for the eye and/or feedback or guidance provided via the user attention device. Responsive to detection of the eye and/or iris, e.g., within the visibility or detection cone of the sensor, within an operating distance of the system, and/or within a visibility cylinder of the user attention device, the sensor may acquire imagery or biometric information of the iris.

It should be noted that certain passages of this disclosure can reference terms such as "first" and "second" in connection with devices (e.g., sensors, cameras, iris recognition modules), images, etc., for purposes of identifying or differentiating one from another or from others. These terms are not intended to merely relate entities (e.g., a first image and a second image) temporally or according to a sequence, although in some cases, these entities can include such a relationship. Nor do these terms limit the number of possible entities (e.g., sensors or devices) that can operate within a system or environment.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, or a combination hardware and software, using embodiments of elements described in FIGS. 1A-1C for instance. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Various embodiments described herein are to be understood in both open and closed terms. In particular, additional features that are not expressly recited for an embodiment may fall within the scope of a corresponding claim, or can be expressly disclaimed (e.g., excluded by negative claim language), depending on the specific language recited in a given claim.

Unless otherwise stated, any first range explicitly specified also may include or refer to one or more smaller inclusive second ranges, each second range having a variety of possible endpoints that fall within the first range. For example, if a first range of 3 dB<X<10 dB is specified, this also specifies, at least by inference, 4 dB<X<9 dB, 4.2 dB<X<8.7 dB, and the like.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for directing a gaze of a user to one of different locations or positions of an iris biometric acquisition system for accommodating different heights of individuals, the system comprising:
   a visibility limiting device;
   a user attention device positioned behind the visibility limiting device relative to a user, the visibility limiting device configured to limit an angular field of view of the user attention device, the visibility limiting device comprising a plurality of horizontal louvers oriented non-parallel to each other towards a preferred location to align the user's gaze towards the preferred location when the user is at a predefined operating distance from the visibility limiting device; and
   a sensor positioned adjacent to the visibility limiting device relative to the user, the sensor configured to acquire imagery of an iris of the user positioned using the user attention device and the visibility limiting device.

2. The system of claim 1, wherein the user attention device includes at least one of a mirror or a graphical user interface display.

3. The system of claim 1, wherein the visibility limiting device further includes a privacy film.

4. The system of claim 1, comprising a first subsystem that comprises the visibility limiting device, the user attention device and the sensor, and a second subsystem that comprises a second visibility limiting device, a second user attention device and a second sensor.

5. The system of claim 4, wherein the first subsystem and the second subsystem are vertically displaced with respect to each other to accommodate different heights of individuals.

6. The system of claim 4, wherein the first subsystem and the second subsystem are vertically displaced with respect to each other by between 4 inches to 12 inches.

7. The system of claim 4, wherein the angular field of view of the user attention device of the first subsystem and an angular field of view of the second user attention device of the second subsystem overlap by a minimal to zero amount at an operating distance of the iris biometric acquisition system.

8. The system of claim 1, comprising an adjustment mechanism for collectively moving the visibility limiting device, the user attention device and the sensor to different height locations or positions.

9. The system of claim 1, comprising a pivot mechanism for collectively tilting or rotating the visibility limiting device, the user attention device and the sensor to different relative positions about a horizontal axis.

10. The system of claim 1, wherein the angular field of view of the user attention device, limited by the visibility limiting device, projects upwards at an angle above horizontal.

11. The system of claim 1, wherein the visibility limiting device comprises a plurality of horizontal louvers oriented in a non-parallel fashion to point towards a preferred location for positioning a user's eye.

12. The system of claim 1, wherein an angular field of view of the sensor overlaps with the angular field of view of the user attention device, limited by the visibility limiting device.

13. An iris biometric acquisition system comprising:
   a mirror to reflect an image of an eye of a user towards the user;
   a visibility limiting device comprising a plurality of horizontal louvers, disposed between the user and the mirror to limit an angular field of view of the mirror, the plurality of horizontal louvers oriented non-parallel to each other towards a preferred location to align the user's gaze towards the preferred location when the user is at a predefined operating distance from the visibility limiting device; and
   an image sensor to acquire an image of the iris of the user when the iris is within the angular field of view of the mirror.

14. The iris biometric acquisition system of claim 13, comprising a first subsystem that comprises the mirror, the visibility limiting device and the sensor, and a second subsystem that comprises a second mirror, a second visibility limiting device and a second sensor.

15. The iris biometric acquisition system of claim 14, wherein the first subsystem and the second subsystem are vertically displaced with respect to each other to accommodate different heights of individuals.

16. A method for directing a gaze of a user to one of different locations or positions of an iris biometric acquisition system for accommodating different heights of individuals, the method comprising:
   limiting, by a visibility limiting device positioned between a user attention device and a user, an angular field of view of the user attention device;
   providing, by the visibility limiting device and the user attention device, guidance to the user to position an iris of the user in accordance with the limited angular field of view, the visibility limiting device comprising a plurality of horizontal louvers oriented non-parallel to each other to align the user's gaze towards a preferred location when the user is at a predefined operating distance from the visibility limiting device; and
   acquiring, by a sensor positioned adjacent to the visibility limiting device relative to the user, imagery of the iris positioned in accordance with the guidance provided by the visibility limiting device and the user attention device.

17. The method of claim 16, wherein the user attention device includes at least one of a mirror or a graphical user interface display.

18. The method of claim 16, wherein the visibility limiting device further includes a privacy film.

19. The method of claim 16, further comprising moving, by an adjustment mechanism, the visibility limiting device, the user attention device and the sensor collectively, to a first height position relative to the user.

20. The method of claim 16, further comprising tilting or rotating, by a pivot mechanism about a horizontal axis, the visibility limiting device, the user attention device and the sensor collectively, to a first position relative to the user.

* * * * *